United States Patent [19]

Castro et al.

[11] 4,005,482
[45] Jan. 25, 1977

[54] ASYMMETRIC ERASE ACROSS A ROTARY TRANSFORMER TO A ROTATING MAGNETIC HEAD

[75] Inventors: Fernando Castro, Longmont; Richard Lewis O'Day, Boulder, both of Colo.

[73] Assignee: International Business Machines Corporation, Armonk, N.Y.

[22] Filed: June 6, 1975

[21] Appl. No.: 584,546

[52] U.S. Cl. ................................................. 360/66
[51] Int. Cl.² ........................................... G11B 5/02
[58] Field of Search ............... 360/66, 84; 346/74.1

[56] References Cited

UNITED STATES PATENTS

| | | | |
|---|---|---|---|
| 3,276,032 | 9/1966 | Ordower | 360/66 |
| 3,504,116 | 3/1970 | Sato | 360/66 |
| 3,852,812 | 12/1974 | Reisfeld | 360/66 |
| 3,900,894 | 8/1975 | Aziz | 360/66 |
| 3,911,477 | 10/1975 | Lackner | 360/66 |

*Primary Examiner*—Jay P. Lucas
*Attorney, Agent, or Firm*—Gunter A. Hauptman

[57] ABSTRACT

The equivalent of D.C. erase in magnetic tape using a rotating head is accomplished by transmitting a time asymmetric square wave across a rotary transformer to the rotating head. The time asymmetry of the square wave in combination with passage of the square waveform across the rotary transformer creates in the rotating head an erase current asymmetric in amplitude about an average value. The short interval of the square wave has a large amplitude in one direction and the long interval portion of the square wave has a short amplitude in the opposite direction. This current signal in the head produces alternately a large flux bubble above the head and a small flux bubble above the head. By maintaining the relative head to tape speed such that the large flux bubble always overlaps the small flux bubble, the tape can be D.C. erased by an asymmetric waveform. A double-ended driving circuit and a single-ended driving circuit are shown for driving across a rotary transformer to the rotating head with the asymmetric waveform.

10 Claims, 5 Drawing Figures

ASYMMETRIC ERASE ACROSS A ROTARY TRANSFORMER TO A ROTATING MAGNETIC HEAD

BACKGROUND OF THE INVENTION

1. Field of the Invention

This invention relates to erasing magnetic tape in high frequency data recording or video recording. More particularly, the invention relates to D.C. erasing magnetic tape with an asymmetric waveform.

2. History of the Art

There are three basic techniques that can be used to erase magnetic tape—A.C. erase, D.C. erase and bulk erase. Bulk erase refers to subjecting the tape to a damped sinusoidal waveform. When the sinusoidal waveform has died to zero amplitude, essentially zero remnant magnetic state is left in the magnetic tape. This is the most desirable erase condition for the magnetic tape. However, it is practical only for erasing entire reels of tape. In erasing blocks of information on tape, or portions of a tape, it is impractical to use a damped sinusoidal erase signal. This is due simply to the fact that the damped sinusoidal waveform would require a number of passes by the same head over the same area of the tape. Alternatively, multiple heads sequentially spaced one after the other might be used to create an equivalent damped sinusoidal erase signal for a given area of tape as it moved past the heads. Either of the above two techniques are unattractive from the standpoint of operating speed and cost.

D.C. erase of magnetic tape is probably the next most desirable erase technique after damped sinusoidal or bulk erase. The only apparent disadvantage of D.C. erase is that it does leave a D.C. remnant state in the magnetic tape. In the subsequent recordings, this D.C. remnant state may make it easier to record on the tape in one orientation rather than another orientation. As a result, distortion in recorded signals can occur due to time asymmetry created in the recorded signal by the relative hard or relative easy direction of magnetization during recording. This distortion is predictable and does not create noise problems when reading the magnetic tape.

Another problem associated with D.C. erase is that a D.C. signal cannot be passed across a transformer to a rotating magnetic head. In rotating head recording, signals to the magnetic head are typically coupled from a stator to a rotor carrying the head by use of a rotary transformer. A D.C. erase signal cannot be passed by a transformer. A prior solution to this problem is to place electronics on the rotor effectively generating the D.C. power on the rotor itself. An A.C. signal would be passed across a rotor and could be rectified and controlled to produce a D.C. signal. The D.C. signal generated on the rotor could then be used to drive a D.C. erase signal for a head on the rotor. While such an approach is feasible, it increases the cost and complexity of the rotor.

Obviously an A.C. erase signal could be used with a transformer to pass an erase signal to a rotating head. However, A.C. erase signals are probably the least desirable of the options in erasing magnetic tape. This is especially true at the high frequencies usually encountered with rotating head recording. For example, if the rotating head data frequency is nominally 10 MHz (Megahertz), then an A.C. erase signal should be in the order of 20–25 MHz. Further, this high frequency signal should have an amplitude such as to easily penetrate the full depth of the magnetic tape. These conditions place an abnormally high power requirement on driving the erase head.

Another potential problem with A.C. erase is that it leaves a low frequency residual in the magnetic tape after the erase is complete. In other words, the spectrum of the signal read from magnetic tape after an A.C. erase contains a hump of low frequency noise below a frequency ¼ that of the erase frequency. The effect of this low frequency residual in the magnetic tape when reading subsequently recorded data signals is not easily predicted.

Therefore, it is the object of this invention to erase magnetic tape with a cyclic waveform that produces the effect of a D.C. erase.

SUMMARY OF THE INVENTION

In accordance with this invention, the above object has been accomplished by driving a magnetic head with an asymmetric wave which is asymmetric in time and asymmetric in amplitude about its average value. Further, the asymmetric erase has a cycle rate dependent upon the relative velocity between the magnetic tape and the head. In effect, the long interval pulse of the asymmetric wave creates a low amplitude flux bubble, while the short interval pulse of the asymmetric wave creates a large amplitude flux bubble from the magnetic head. The velocity of the tape relative to the head is such that the large flux bubble has a width $W_1$ large enough to erase the entire width $W_2$ of the small flux bubble. The relationship between the cyclic frequency of the asymmetric waveform and the tape velocity V is given by the following expression:

$$f \geq (V)/[(W_1-W_2)/2]$$

As a further feature of the invention, time asymmetry with asymmetry in amplitude about an average value for the asymmetric erase waveform is accomplished by converting a time asymmetric square waveform that may have some D.C. component to a time and amplitude asymmetric waveform with substantially no zero frequency, i.e., no D.C. component. The conversion is achieved by passing the asymmetric square waveform across a transformer to a magnetic head. The asymmetric erase waveform produced on the magnetic head then performs the equivalent of a D.C. erase on the magnetic tape. Thus the transformer in combination with at least a time asymmetric waveform produces the desired time and amplitude asymmetric erase waveform with no D.C. component at the magnetic head.

The great advantage of this invention is that it achieves the effect of a D.C. erase with a cyclic waveform. Thus the cyclic waveform may be transmitted across a rotary transformer as is typically required in the rotating head magnetic recording technology. With this invention, the equivalent of D.C. erase may be achieved with a rotating magnetic head recorder without the necessity of placing expensive and complex electronics on the rotor carrying the magnetic head.

The foregoing and other objects, features and advantages of the invention will be apparent from the following more particular description of the preferred embodiment of the invention as illustrated in the accompanying drawings.

DETAILED DESCRIPTION

Figure 1:
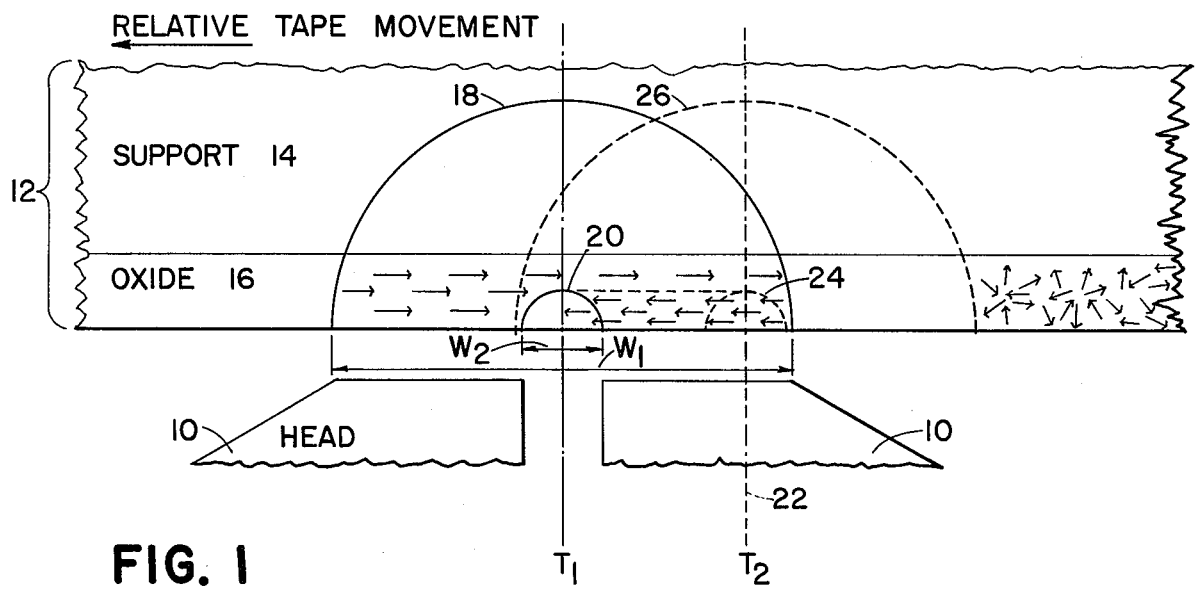
FIG. 1 is a schematic representation of flux bubbles created by the asymmetric wave during the asymmetric erase.
Figure 2:
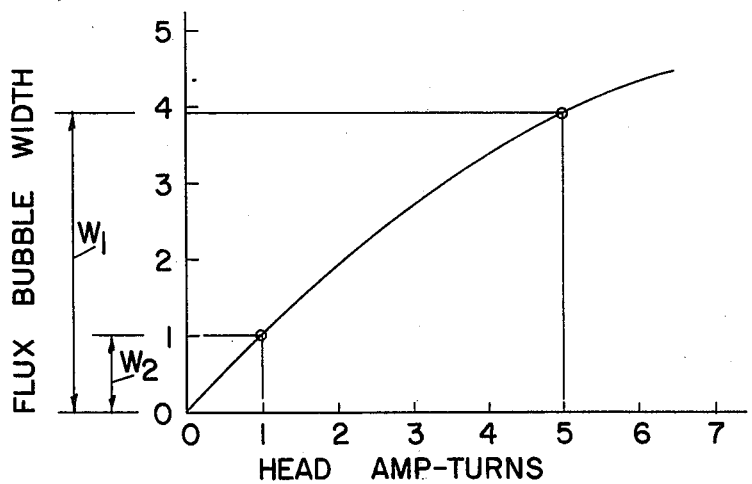
FIG. 2 is a graph showing the relationship between ampere turns in the magnetic head and the width of the flux bubble in the magnetic tape.
Figure 3:
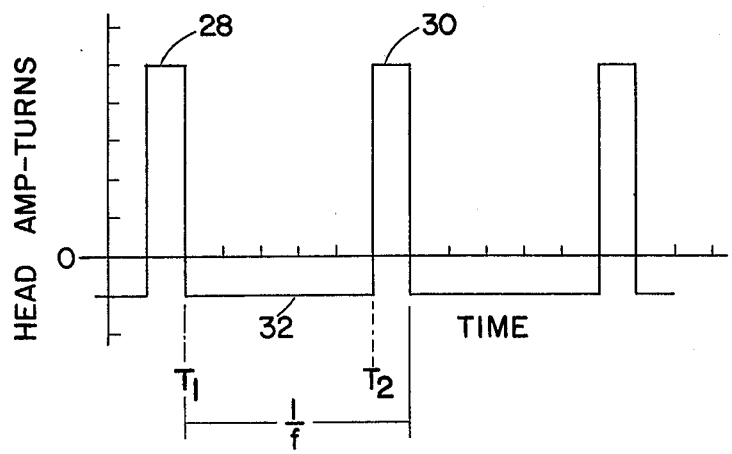
FIG. 3 is an example of an asymmetric wave to produce the flux bubbles in FIG. 1.

Referring now to FIGS. 1, 2 and 3, the manner in which the asymmetric waveform produces an equivalent D.C. erase in the magnetic tape will be described. As shown in FIG. 1, the magnetic head 10 and the magnetic tape 12 have been enlarged many times in the schematic representation. The MYLAR backing 14 for the tape carries the magnetic oxide layer 16 in which the tape stores magnetic states. In addition, magnetic flux bubbles at different times in the tape are represented in FIG. 1.

At time T1 (present position of the head 10), the head has just stopped generating the large flux bubble 18 and is generating the small flux bubble 20. At time T2, relative movement between the head 10 and the tape 12 shifts head 10 to be centered about centerline 22. To simplify the drawings in FIG. 1, head 10 has not been redrawn in this position.

At time T2 the bubble 20 is now in the position indicated by small bubble 24. While bubble 24 is being terminated at time T2, large bubble 26 is coming on at T2.

The width $W_1$ of the large bubbles 18 and 26 is much greater than the width $W_2$ of the small bubbles 20 and 24. As diagrammed in FIG. 2, the width of the large bubble 26 must be sufficient so that it reaches back and covers at time T2 the entire width of the small bubble 20 generated at time T1. As long as this condition exists, the entire length of the tape will be erased with the orientation of the flux of the large bubbles. Accordingly, the relationship between the frequency F or pulse rate of the asymmetric waveform to the velocity V of the tape is given by the expression:

$$F \geq V/[(W_1-W_2)/2]$$

Referring now to FIG. 3, an example of an asymmetric waveform to produce the flux bubbles of FIG. 1 is shown. The large flux bubbles 18 and 26 are produced by the high amplitude positive pulses 28 and 30 in FIG. 3. The small flux bubbles 20 and 24 were produced by the low amplitude negative pulses 32 in FIG. 3. As the low amplitude pulse 32 has a relatively long duration, the flux bubble 20 as depicted in FIG. 1 is dragged along the tape as the tape moves relative to the head. Thus, effectively flux bubble 20 and flux bubble 24 are the same flux bubble that has been dragged for a time interval from T1 to T2.

The relationship between the width of the flux bubbles as depicted in FIG. 1 and the strength of the current in the head as depicted in FIG. 3 is shown in the graph of FIG. 2. For head ampere turns of unit 1, the flux bubble relative width is 1. For head ampere turns of unit 5, the relative flux bubble width is 3.8. As discussed above, the width of the flux bubbles and the velocity of the tape demand a minimum frequency or pulse rate for the asymmetrical erase waveform on the magnetic head to accomplish the effect of D.C. erase on the magnetic tape.

Figure 4:
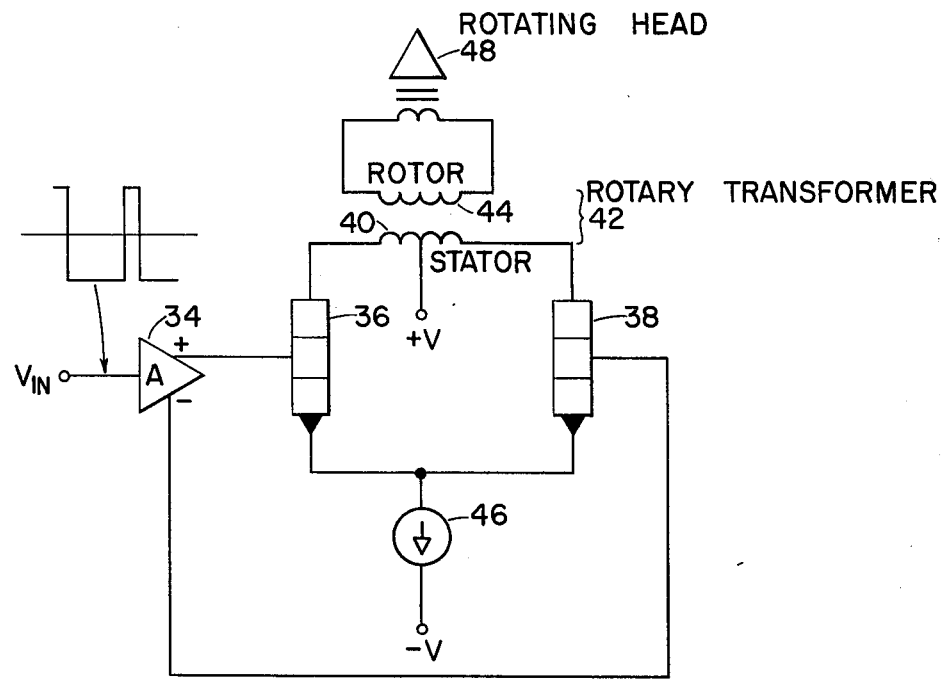
FIG. 4 shows the preferred embodiment of the invention for driving a rotating head with a bipolar asymmetric waveform.

FIG. 4 shows one preferred embodiment of the invention wherein a double ended driver generates the asymmetric waveform for the rotating head. Initially the asymmetric waveform is applied to the amplifier 34. Amplifier 34 produces a bipolar asymmetric waveform to drive the bases of transistors 36 and 38. Transistors 36 and 38 are alternately turned on and off by the bipolar asymmetric waveform applied to their bases. This effectively switches the direction of current flowing from the positive voltage center tap of the primary 40 of rotary transformer 42.

Current through the primary 40 is controlled by the current in the current source 46. Current source 46 pulls the current from the positive voltage source at the primary 40 through one of the transistors 36 and 38 and into the negative voltage source V. Accordingly, as the asymmetric waveform changes from an up level to a down level, the current in the primary winding 40 switches direction.

The primary 40 of the rotary transformer 42 is the stator portion of the transformer. The secondary 44 of the transformer 42 is the rotor portion and is on the rotor that carries the rotating head 48. The asymmetrical waveform picked up by the secondary 44 is passed directly to the coils of the rotating head 48. As the asymmetric waveform has been passed across the rotary transformer 42, the D.C. component is eliminated in the signal applied to the rotating head 48. With the asymmetric waveform applied to the rotating head 48, the head 48 erases magnetic tape as previously described with reference to FIGS. 1, 2 and 3.

Figure 5:
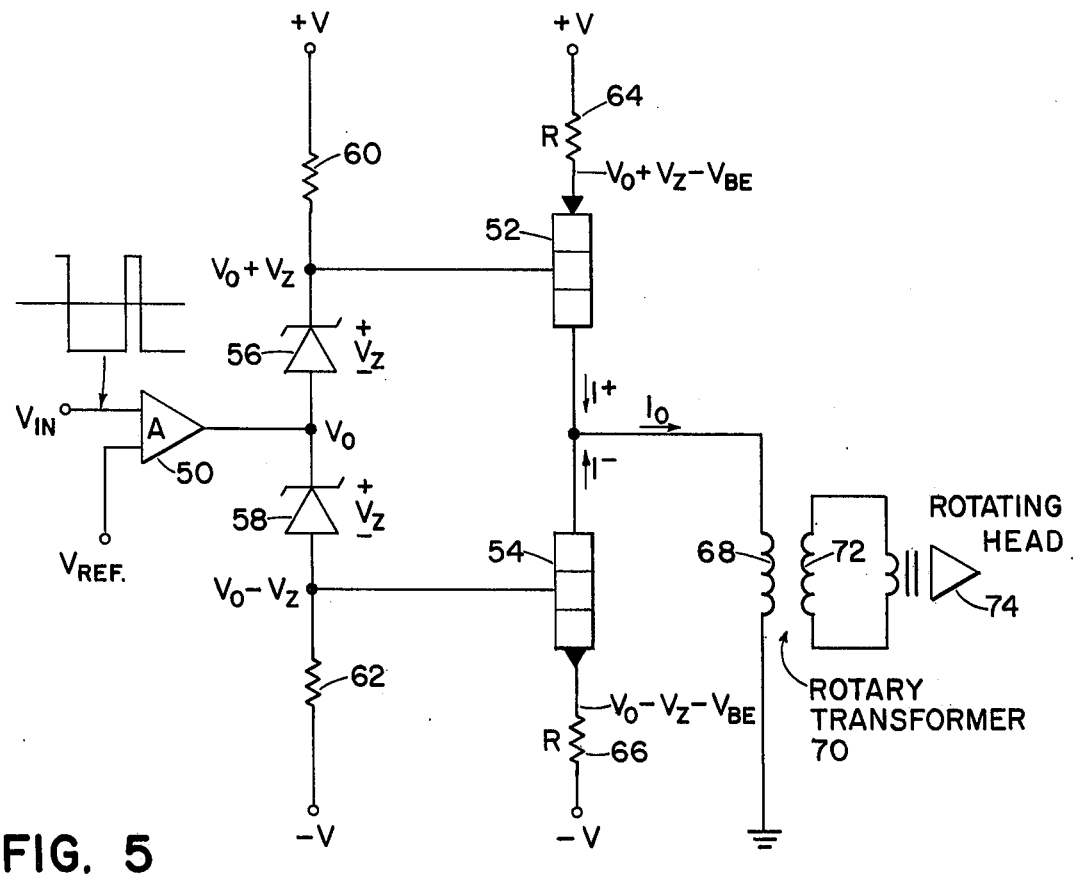
FIG. 5 shows an alternative preferred embodiment of the invention with a single ended driver to produce the asymmetric waveform for the rotating head.

In FIG. 5 an alternative preferred embodiment using a single ended driver to drive the rotating head is shown. The asymmetric waveform is applied to the amplifier 50. Amplifier 50 acts as a comparator to compare the voltage level of the asymmetric waveform N to a reference level. The reference level is optimumly about halfway between the positive amplitude and negative amplitude of the time asymmetric waveform $V_{IN}$. Amplifier 50 has one level of voltage output when the $V_{IN}$ is above the reference, and another level of voltage output when the $V_{IN}$ is below the reference. Accordingly, the effect of amplifier 50 is to assure that the asymmetric waveform is an asymmetric square wave.

The voltage level Vo at the output of amplifier 50 controls the amount of current passed by transistors 52 and 54. Biasing for the transistors 52 and 54 is provided by the Zener diodes 56 and 58 and by resistors 60 and 62. Zener diodes 56 and 58 are backbiased by the voltage sources +V and −V so that they always provide a constant voltage drop of Vz between Vo and the bases of transistors 52 and 54.

With the voltage at the bases of the transistors 52 and 54 defined, the voltage at their emitters is also defined since the voltage from base to emitter is in the order of half a volt. The current I+ and I− through transistors 52 and 54 is then defined by the matched resistors 64 and 66, respectively.

The voltage levels Vo out of the amplifier 50 are chosen such that the current Io into the primary 68 of the rotary transformer 70 switches polarity for each level of the asymmetric waveform. In other words, transistors 52 and 54 are always conducting, but in one condition Io is a current towards ground through primary 68, and in the other condition Io is a current from ground through primary 68. With the voltage levels Vo being symmetrical about a ground, and with the Zener diodes 56 and 58 being matched and resistors 64 and 66 being matched, the current Io will be an asymmetric waveform in time, but symmetrical in current amplitude about ground.

The secondary 72 of the rotary transformer, however, sees a time and amplitude asymmetric waveform because the transformer does not pass a D.C. component. Asymmetric waveform from secondary 72 is applied to the coils of the rotating head 74. The rotating head 74 produces the equivalent of the D.C. erase in the magnetic tape as previously described with reference to FIGS. 1, 2 and 3.

It will be apparent to one skilled in the art that asymmetric erase might be used in other environments besides rotating-head magnetic recording. It is particularly useful in any environment where it is not possible to transmit a D.C. signal to a magnetic head. On the other hand, the invention might still be used in an environment where the asymmetric erase waveform has a D.C. component. However, in this latter case the asymmetric erase waveform must have enough amplitude and time asymmetry to produce a large flux bubble to overlap a small flux bubble as the magnetic head moves relative to the magnetic storage medium.

Further, it will be appreciated by one skilled in the art that any number of driver circuits might be designed to produce the asymmetric erase signal for the magnetic head erasing the magnetic tape. Accordingly, while the invention has been particularly shown and described with reference to preferred embodiments thereof, it will be understood by one skilled in the art that various changes in form and details may be made therein without departing from the spirit and scope of the invention.

What is claimed is:

1. In a magnetic storage system, having a magnetic storage medium and a magnetic head for erasing the storage medium, and wherein there is relative motion between the magnetic head and the magnetic storage medium, improved apparatus for D.C. erasing the magnetic storage medium with a cyclic waveform comprising:

means electrically connected to said magnetic head for converting a time asymmetric cyclic waveform into an amplitude and time asymmetric cyclic waveform and applying said time and amplitude asymmetric waveform to said magnetic head;

means electrically connected to said conversion means for driving said conversion means with a time asymmetric waveform whereby said head through said conversion means is driven with a time and amplitude asymmetric waveform to perform the equivalent of a D.C. erase on the magnetic storage medium as the medium moves relative to said magnetic head.

2. The apparatus of claim 1 wherein said conversion means comprises a transforming means with the primary electrically connected to said driving means and the secondary electrically connected to said magnetic head, said transforming means for transforming the amplitude of the time asymmetric waveform on the primary to an amplitude asymmetric condition about an average value on the secondary whereby the time and amplitude asymmetric waveform when applied to the magnetic head produces the equivalent of D.C. erase on the magnetic storage medium.

3. The apparatus of claim 2 wherein said transforming means comprises:

a rotary transformer having a primary on a stator electrically connected to said driving means and a secondary on a rotor electrically connected to said magnetic head; and said magnetic head being mounted on the rotor of said rotary transformer whereby the equivalent of D.C. erase can be accomplished with a rotating magnetic head.

4. The apparatus of claim 2 wherein said driving means is a double-ended driver having two transistors driven by bipolar signals to switch current direction in the primary of said transforming means.

5. The apparatus of claim 2 wherein said driving means is a single-ended driver for driving a time asymmetric current signal in the primary of said transforming means.

6. Method for producing a D.C. erase in a magnetic storage medium with a magnetic head having motion relative to the magnetic storage medium comprising the steps of:

driving the magnetic head with a high amplitude pulse of short duration to produce a large flux bubble in the magnetic storage medium;

driving the magnetic head with a low amplitude pulse of long duration to produce a small flux bubble, the polarity of the low amplitude pulse being opposite to the polarity of said high amplitude pulse;

cycling the high amplitude and low amplitude pulses at a frequency such that the large flux bubble will always overlap the recorded effect of the small flux bubble despite relative motion between the magnetic head and the magnetic storage medium.

7. The method of claim 6 wherein said cycling step operates at a frequency F greater than or equal to the velocity of the tape divided by one-half of the difference between the widths of the large flux bubble and the small flux bubble.

8. The method of claim 6 wherein said driving steps comprise the steps of:

generating a time asymmetric square waveform;

converting the time asymmetric square waveform into a time and amplitude asymmetric square waveform with substantially no D.C. component;

applying the time and amplitude asymmetric waveform to the magnetic head to produce the large flux bubbles and the small flux bubbles.

9. A rotating-head magnetic tape recorder having a magnetic head carried by a rotor for erasing magnetic tape and having apparatus for producing the equivalent of D.C. erase on the magnetic tape, said D.C. erase apparatus comprising:

means for generating a time asymmetric square waveform;

rotary transformer means connected between said generating means and said head on said rotor for transforming the time asymmetric waveform into a time and amplitude asymmetric square waveform across the transformer interface to said head, the time and amplitude asymmetric square waveform having large amplitude and short amplitude pulses of opposite polarity and equal energy content;

said magnetic head creating large flux bubbles with the large amplitude pulses in said square waveform and small flux bubbles of opposite polarity to said large flux bubbles with the small amplitude pulses of said square waveform, said large flux bubbles always overlapping the recorded effect of said small flux bubbles as said magnetic head moves relative to said magnetic tape.

10. The apparatus of claim 9 wherein said generating means generates the time asymmetric square waveform at a cyclic frequency greater than or equal to the velocity of the tape divided by one-half of the difference in width between the large flux bubbles and the small flux bubbles.

* * * * *